United States Patent [19]

Lombana et al.

[11] E Re. 31,046

[45] Reissued Oct. 5, 1982

[54] INCINERATION METHOD AND SYSTEM

[75] Inventors: Luis A. Lombana; Jose G. Campos, both of Belmont, Calif.

[73] Assignee: Lurgi Corporation, Belmont, Calif.

[21] Appl. No.: 66,701

[22] Filed: Aug. 15, 1979

Related U.S. Patent Documents

Reissue of:

[64] Patent No.: 4,013,023
Issued: Mar. 22, 1977
Appl. No.: 645,063
Filed: Dec. 29, 1975

[51] Int. Cl.[3] ..... F23G 5/12

[52] U.S. Cl. ..... 110/187; 110/212; 110/225; 110/346

[58] Field of Search ..... 110/187, 203, 205, 208, 110/209-212, 214, 225, 346; 432/96, 99, 100, 25; 34/85, 35, 212

[56] References Cited

U.S. PATENT DOCUMENTS

| | | | |
|---|---|---|---|
| 2,015,051 | 9/1935 | Baird | 110/225 |
| 2,063,630 | 12/1936 | Schilling | 110/225 |
| 2,114,566 | 4/1938 | Lewers | 110/346 |
| 2,795,054 | 6/1957 | Bowen | 34/35 |
| 3,727,564 | 4/1973 | Anderson et al. | 110/212 |
| 3,791,317 | 2/1974 | Schrage et al. | 110/212 |
| 3,792,671 | 2/1974 | Woods | 110/212 |
| 3,807,321 | 4/1974 | Stockman | 110/225 |
| 3,861,334 | 1/1975 | Stockman | 110/212 |
| 3,868,779 | 3/1975 | Wilt, Jr. et al. | 34/212 |
| 3,887,326 | 6/1975 | Townley | 432/25 |
| 3,958,920 | 5/1976 | Anderson | 110/225 |
| 4,038,032 | 7/1977 | Brewer et al. | 110/187 |

FOREIGN PATENT DOCUMENTS 1349910 4/1974 United Kingdom .

*Primary Examiner*—Henry C. Yuen
*Attorney, Agent, or Firm*—Flehr, Hohbach, Test, Albritton & Herbert

[57] ABSTRACT

The following disclosure teaches ways and means for incinerating organic wastes in a multiple hearth furnace equipped with an afterburner. In the furnace, the wastes are pyrolyzed in an oxygen deficient atmosphere which is regulated to only partially complete the oxidation of the organic substances which are pyrolyzed from the wastes. In the afterburner, air is introduced to complete the oxidation of the partially oxidized substances carried by gases and vapors from the furnace. The air supply to the afterburner is controlled so that, at temperatures above a predetermined temperature, the quantity of air introduced is increased with increasing temperatures and is decreased with decreasing temperatures. In other words, the pyrolyzing furnace is caused to operate with a deficiency of air over its operating range, while the afterburner is caused to operate with excess air and the amount of excess air supplied is used to control the operating temperature by quenching.

13 Claims, 2 Drawing Figures

INCINERATION METHOD AND SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to organic waste disposal and, more particularly, to improved ways and means for incinerating sewage sludge.

2. State of the Art

When incinerating partially dewatered sewage sludge by means of a multiple hearth furnace equipped with an afterburner, it is conventional practice to completely burn (i.e., completely oxidize) all the organics in the sludge within the furnace by supplying auxiliary fuel and air thereto, and then to raise the temperature of the furnace exhaust gases in the afterburner to eliminate odors. To insure complete oxidation of the organics in the furnace, it is conventional practice to supply more air to the furnace than is needed stoichiometrically. To raise the temperature of the off gases in the afterburner, it is usual practice to add auxiliary fuel and further air thereto.

OBJECTS OF THE INVENTION

The principal object of the present invention is to provide improved ways and means for incinerating sewage sludge utilizing a multiple hearth furnace which is either equipped with an external afterburner or whose uppermost hearth is operated to serve, in effect, as an afterburner.

BRIEF DESCRIPTION OF THE DRAWINGS

Further objects and advantages of the present invention may be readily ascertained by reference to the following description and appended drawings which are offered by way of example only and not in limitation of the invention, the scope of which is defined by the appended claims and equivalents to the acts and structure define therein. In the drawings.

DETAILED DESCRIPTION OF THE PREFERRED EMBODIMENT

Figure 1:
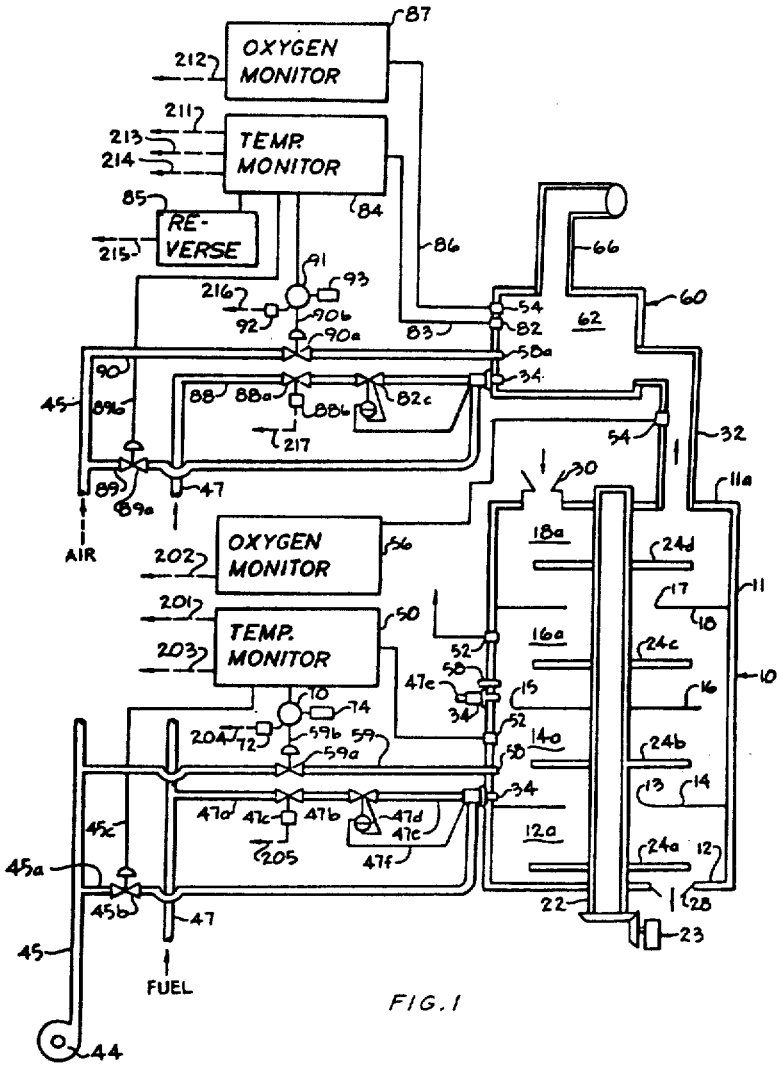
FIG. 1 is a schematic diagram illustrating one portion of the system in accordance with the present invention.

Referring now to FIG. 1, a multiple hearth furnace 10 of conventional construction includes a refractory housing 11 of upright cylindrical configuration with a top closure member 11a. Within the housing are fixed a selected number of superimposed horizontal hearths 12, 14, 16 and 18 which are spaced apart relative to one another and to the top closure member 11a to define intervening hearth spaces 12a, 14a, 16a and 18a, respectively. The hearth spaces are in communication, one with another, via openings 13, 15 and 17 formed through the respective hearths 14, 16 and 18 at alternate central and peripheral locations. A vertical shaft 22 extends centrally through the superposed hearths and is coupled to a drive means 23 for rotation. The shaft 22 carries radially-extending rabble arms 24a, 24b, etc., positioned to rake material progressively across the hearths to the associated central or peripheral openings. A selectively closable feed hopper 30 is in communication with the upper hearth space 18a via an opening formed in the top closure member 11a. Also in communication with the upper hearth space 18a is an exhaust stack 32 mounted in a second opening formed through the closure member 11a. At the base of the furnace, a selectively closable discharge chute 28 is mounted in an opening formed through bottom hearth 12.

Conventional burners 34 are mounted through the wall of the refractory housing 11 in communication with particular ones of the hearth spaces. Hearth spaces containing burners 34 are hereinafter said to be fired; in the illustrated embodiment, only the two middle hearth spaces 14a and 16a are fired. Typically, several burners are mounted in each of the fired hearth spaces, the exact number being a matter of design choice.

Fuel, such as natural gas, is fed to the burners via a main distributor pipe 47 from which branch pipes 47a lead to the individual fired hearths. (To simplify the drawings, only the fuel branch pipe leading to the fired hearth space 14a is shown in FIG. 1.) In each fuel branch pipe 47a is mounted a shut-off valve 47b actuated by a solenoid 47c to govern the supply of fuel to the associated hearth space. (In the following description, it will be assumed that a shut-off valve 47b is open if its associated solenoid 47c is energized and is closed if its associated solenoid is de-energized.) From the shut-off valve 47b, lines 47e lead to the individual burners in the associated hearth spaces or, alternatively, a bustle-pipe type arrangement to supply several burners in the same hearth space can be utilized. In the fuel inlet line 47e to each of the burners is interposed a modulating valve 47d, say of the globe type, which controls the amount of fuel flowing into the burner. According to the drawings, the modulating valves 47d are controlled by pneumatic signals which are carried by lines 47f and which are responsive to the quantity of air supplied to the burner. That is, the pneumatic signals control the burners so that the fuel-air ratio is maintained constant at some valve regardless of air flow. Such burners are conventional and generally widely known in this art. Alternatively, a conventional mechanical control can be utilized which also maintains the fuel-air ratio constant at the burners.

To supply air to the system, a blower 44 is connected to a main distributor conduit 45 from which branch conduits 45a lead to the individual burners or to a bustle pipe which serves a number of burners in the same hearth space. In each of the air branch conduits 45a there is interposed a variable-position modulating damper 45b which automatically controls the air flow therethrough according to the amplitude of control signals carried by lines 45c from a temperature monitoring unit 50 which, in turn, is coupled to a temperature probe 52 mounted in the associated hearth space. One such temperature monitoring unit is associated with each fired hearth space but, for purposes of clarity, only the unit 50 associated with hearth space 14a is shown in FIG. 1.

Each temperature monitoring unit 50 functions to develop a control signal whose amplitude varies monotonically with the sensed temperature over a broad range. The control signals from the illustrated unit 50 are assumed to be pneumatic in the following description, but a temperature monitoring unit with electrical output signals could be utilized equivalently. In any event, the control signals are applied to the modulating damper 45b in the manner such that the damper progressively closes with increasing temperatures and progressively opens with decreasing temperatures. Such temperature monitoring units and modulating dampers are conventional and widely known in this art. Because of the action of the damper 45b, the quantity of air which flows through a branch line 45a is generally inversely related to the temperature sensed in the hearth space 14a. In other words, the air supply to the hearth space 14a is decreased with increasing temperatures and is increased with decreasing temperatures. This is called a reverse action control and is basically the same in result as the so-called inverse mode of operation which will be described later herein.

Connected in communication with the furnace exhaust stack 32 is an afterburner 60. The afterburner includes a combustion chamber 62 and a gas outlet 66. Through the wall of the afterburner are mounted conventional burners 34a. The afterburner control system will be described further hereinafter.

As described to this point, the multiple hearth furnace 10 is conventional. Were that furnace operated in a conventional manner, partially dewatered sewage sludge would be introduced through the feed hopper 30 and then would be dried as it was rabbled across the upper hearth 18 to discharge onto the next lower hearth 16 via the central opening 17. As the sludge was followingly rabbled across the fired hearths 16 and 14, the organics therein would be completely incinerated. Following that, the ashes and noncombustibles would be rabbled onto the lower hearth 12 for cooling and then would be discharged through the chute 28. Incineration in the fired hearths would be effectuated and sustained by supplying fuel and air through the burners 34. Typically, the amount of air supplied would be stoichiometrically excessive in order to assure complete destruction of the organics within the furnace and that would be accomplished by adjusting the fuel-air mixture to be relatively lean. Furthermore, the temperature control in the fired hearth spaces would be achieved by varying the air supply to the associated burners by means of the air modulating valves 47b, even at high temperatures. As the air supply was varied, the fuel supply would also be varied in direct proportion thereto by the fuel modulating valves 47d. (Specifically, the air and fuel supply would be decreased with increasing temperatures and would be increased with decreasing temperatures.) During incineration, the combustion gases and vapors would pass from the middle hearth spaces 14a and 16a into the upper hearth space 18a where they would contact the sludge feed and, because of that contact, would become slightly cooler and malodorous. Also, the combustion gases would drive moisture from the sludge in the upper hearths and would partially dry the sludge. Then, the combustion gases would be discharged from the upper hearth space 18a through the stack 32 and into the afterburner 60. To destroy odor, the gases would be reheated in the afterburner chamber 62 by the introduction of auxiliary fuel and air through burners 34a. The control of fuel and air to the afterburner to effectuate such reheating would be accomplished in essentially the same manner as in the furnace 10, which is to say by the aforementioned reverse action control.

The conventional operation of a sludge incineration furnace was described above in order that the improvements described in the following may be fully appreciated.

Referring again to FIG. 1, an oxygen sensor 54 is mounted at a selected location in stack 32. The sensor 54 is coupled to a conventional oxygen monitoring unit 56 which measures the oxygen level of the gases in the stack and indicates when the oxygen level falls below a certain predetermined level.

In each of the fired hearth spaces in the furnace 10 a selected number of air nozzles 58 are mounted at spaced apart intervals on the wall of the refractory housing 11. A branch conduit 59 extends from the main distributor conduit 45 to each fired hearth space to supply air to the air nozzles associated with the hearth space. (For purposes of clarity, FIG. 1 shows only one air nozzle per fired hearth space and shows only the branch conduit that is associated with that air nozzle.) In each of the branch conduits 59 there is interposed a variable-position modulating damper 59a which controls the air flow to the air nozzles. Each modulating damper 59a is connected to receive the pneumatic output signals from the temperature monitoring unit 50 associated with the same hearth space. The dampers 59a are generally the same as the aforedescribed dampers 45b and are connected to operate in the same manner; that is, the dampers 59a will progressively close and restrict the air flow as the associated temperature monitoring unit senses increasing temperatures and the dampers will progressively open to allow more air flow as the monitoring unit senses decreasing temperatures.

In the illustrated system, the temperature monitoring unit control signals are carried to the modulating dampers 59a by lines 59b. For a given hearth space, the control signals to a modulating damper 59a are identical to the ones applied to the damper 45b associated with the hearth space. Interposed in each control line 59b is a three-way valve 70 which can assume two alternative positions as determined by a solenoid actuator 72 connected thereto. In the first position, the modulating damper 59a is connected, via the three-way valve 70, to a constant pressure source 74 which holds the modulating damper in a predetermined fixed position (e.g., 25% open). In the second position, there is direct communication between the temperature monitoring unit 50 and the modulating damper 59a via the three-way valve 70. In the following description, it will be assumed that a three-way valve 70 is in the first position when its associated solenoid actuator is energized and is in the second position whenever the associated solenoid actuator is de-energized.

Figure 2:
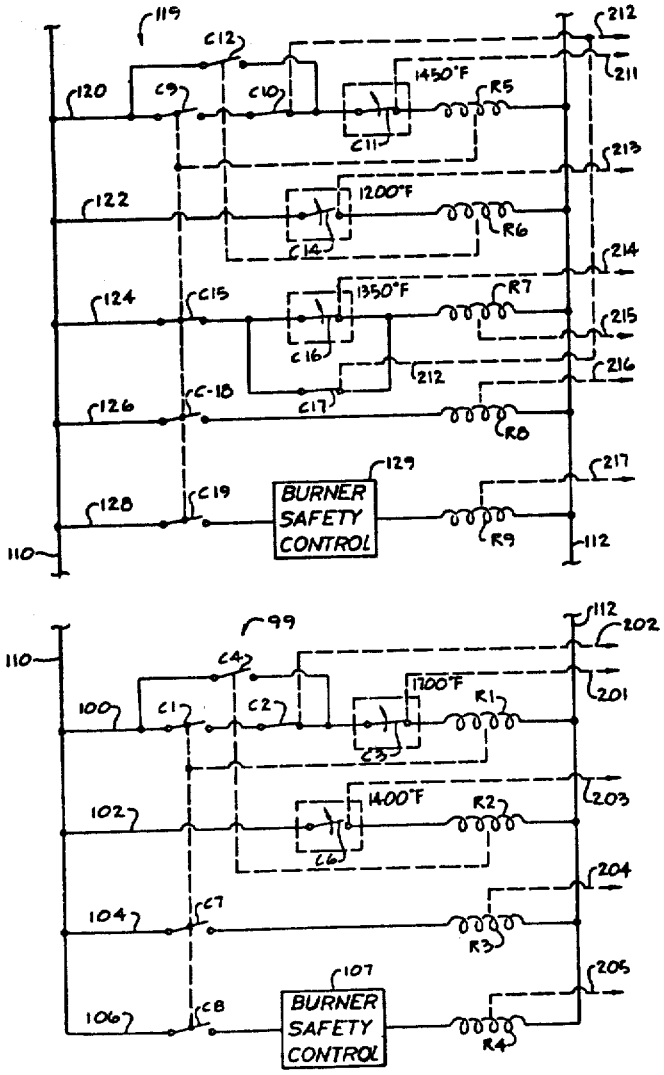
FIG. 2 is a schematic diagram of a second portion of the system of the invention. For ease of understanding, FIGS. 1 and 2 should be viewed together.

In the embodiment illustrated in FIG. 2, the furnace control network 99 for fired hearth space 14a includes four branches 100, 102, 104 and 106 connected in parallel across main conductors 110 and 112. The main conductors are in turn coupled to a power source, not shown, that establishes a constant voltage potential between the conductors. According to this invention, one such control network is provided for each of the fired hearth spaces in the furnace 10 but, for purposes of clarity and explanation, only the control network 99 for the fired hearth space 14a is illustrated here.

Branch 100 in network 99 includes the series combination of a normally open contact C1, a normally closed contact C2, a normally closed temperature-controlled contact C3 and a relay R1. Another normally open contact C4 is connected in parallel across the series combination of contacts C1 and C2. As indicated by the dashed line 201, the contact C3 is controlled by the aforementioned temperature monitoring unit 50; it opens only when temperatures in excess of some predetermined high temperature (e.g., 1700° F.) are sensed within the associated hearth space 14a by the temperature probe 52.

The relay R1, illustrated as a conventional induction device, will be energized only when current flows through branch 100. In the illustrated embodiment, that will occur only when the three contacts C1, C2 and C3 are all closed, or when contacts C4 and C3 are both closed. The relay R1 is connected to actuate the normally open contact C1, as indicated by the dashed line, and controls the position of that contact. In other words, the contact C1 will be open whenever the relay R1 is de-energized and will be closed whenever the relay is energized. (The definition of normally open and normally closed contacts should now be apparent; a contact is of the normally open type when current can flow across it only if its associated controlling relay is energized and, conversely, a contact is of the normally closed type if current can flow across it only if its associated relay is de-energized; in FIG. 2, the contacts are shown schematically in the positions which they will take if their associated relays are de-energized.)

Also in branch 100, the position of the normally closed contact C2 is controlled by the aforementioned oxygen monitoring unit 56 as indicated by the dashed line 202. Specifically, the contact C2 is commanded to open whenever the oxygen level monitored in the stack falls below a certain predetermined value. FIG. 2, therefore, shows contact C2 in the position that is has when the monitored oxygen level is above the limit value.

Branch 102 includes a temperature-controlled contact C6 in series with a relay R2. As indicated by the dashed line 203, the contact C6 is also controlled by the temperature monitoring unit 50 and opens only when the monitoring unit senses temperatures in excess of some predetermined low temperature (e.g, 1400° F.) within the associated hearth space 14a. FIG. 2 shows the contact C6 in the position that it has when temperatures exceed the low temperature limit in hearth space 14a. It should be noted that relay R2 is coupled to control the position of the normally open contact C4 in branch 100 and that contact C4 will be closed whenever relay R2 is energized (i.e., when temperatures in hearth space 14a are below the low temperature limit).

Branch 104 includes a normally open contact C7 in series with a relay R3. The contact C7 is controlled by the aforementioned relay R1 in branch 100 and will be closed whenever that relay is energized. As indicated by the dashed line 204, the relay R3 is connected to control the energization of the solenoid actuator 72 which is coupled to the three-way valve 70. In the illustrated embodiment, it should be understood that energization of the relay R3 energizes the solenoid actuator 72 and that, in turn, places the modulating damper 59a in communication with the constant pressure source 74, the result being that the modulating damper 59a is held in the aforementioned fixed-open position by the constant pressure source. On the other hand, the solenoid actuator 72 is de-energized when the relay R3 is de-energized and, in that case, the modulating damper is under the command of the temperature monitoring unit 50.

Branch 106 includes a series combination of a normally open contact C8, a burner safety control 107, and a relay R4. The contact C8 is controlled by the relay R1 in branch 100 and will be closed only when that relay is energized. The burner safety control 107 is a conventional component which, for present purposes, can be considered to comprise a switch which is open whenever some predetermined unsafe condition exists in the furnace; the unsafe condition could, for example, be that the fan 44 is not operating or that a low fuel pressure condition exists. As indicated by the dashed line 205, the relay R4 is connected to control the solenoid 47c which is coupled to the fuel shut-off valve 47b. In the illustrated embodiment, it should be understood that energization of the relay R4 energizes the solenoid 47c and that, in turn, opens the fuel shut-off valve 47b. On the other hand, when the relay R4 is de-energized, the solenoid 47c is also de-energized and the shut-off valve 47b blocks the fuel supply line 47a.

The operation of the control network 99 for hearth space 14a will now be described. Again, it should be understood that the other fired hearth spaces in the furnace are equipped with identical control systems, all of which will function in the same manner.

Assuming the temperature in the hearth space 14a is below the low temperature limit, both temperature-controlled contacts C3 and C6 will be closed by the action of temperature monitoring unit 50. With contact C6 closed, current will flow through branch 102 and will energize relay R2. Energization of the relay R2 will cause contact C4 to close and, because of that, relay R1 will be energized by the flow of current through branch 100. Energization of the relay R1 will cause contacts C1, C7 and C8 to close. Closure of the contact C7 energizes relay R3 and that, in turn, energizes the solenoid actuator 72 to position the three-way valve 70 such that control signals from the temperature monitoring unit 50 are blocked from reaching the variable-position modulating damper 59a which governs the air supply to the air nozzles 58 in hearth space 14a. In other words, the modulating damper 59a is held in the aforementioned fixed-open position so long as the relay R3 is energized. Closure of contact C8 by the relay R1 will, in turn, energize relay R4 if the burner safety system 107 does not detect an unsafe furnace condition. Energization of relay R4 causes the energization of solenoid 47c and that opens the shut-off valve 47b so that fuel is supplied to the burners 34 in the hearth space 14a. During this time, air is supplied to burners 34 via the branch conduit 45a and the flow therethrough is automatically controlled by the modulating valve 45b under command of the temperature monitoring unit 50. Such commands, as previously mentioned, cause the fuel and air supply to be choked or restricted when the temperatures rise within the hearth space 14a, and cause the fuel and air supply to be increased when the temperatures fall within the hearth space 14a.

Whenever the temperature in the hearth space 14a exceeds the low temperature limit (e.g., 1400° F.), the low temperature contact C6 will open under command of the temperature monitoring unit 50. Opening of the contact C6 will de-energize relay R2 which, in turn, will cause contact C4 to open. However, unless the oxygen level monitored in the stack 32 is below a particular predetermined level as sensed by the oxygen monitoring unit 56, the opening of contact C4 will have no effect upon the fuel or air supply to the hearth space 14a. (That is so because relay R1 will remain energized by current flowing through the series of closed contacts C1, C2 and C3.)

If the temperature in hearth space 14a rises above the high temperature limit (e.g., 1700° F.), contact C3 will open and that will de-energize relay R1. De-energization of the relay R1 also causes contacts C7 and C8 to open and they, in turn, de-energize relays R3 and R4 respectively. As a result of relay R4 being de-energized, solenoid 47c will be de-energized and that will cause the shut-off valve 47b to block the fuel supply line 47a. That is, there will be a "no-fuel" condition. As a result of the relay R3 being de-energized, the solenoid actuator 72 will be de-energized and will cause the three-way valve 70 to shift so that the modulating damper 59a is under the command of the temperature monitoring unit 50 and the air supply to the nozzles 58 in the hearth space 14a is modulated in parallel with the air supply to the burners 34 in the hearth space.

It may be noted that when the relay R1 is de-energized, it opens the contact C1 which precedes it in the branch 100. Therefore, even if contact C3 is subsequently closed due to a decrease in temperature, current cannot flow through branch 100 to energize the relay R1 unless the contact C4 is closed. This so-called temperature dead band feature will be discussed further hereinafter.

The action described for the high temperature situation will also occur if the monitored oxygen level drops below the predetermined limit when the temperature in hearth space 14a is between the high and low temperature limits at which contacts C6 and C3 are actuated. That is, the relay R1 will also be de-energized if contact C2 is opened by the oxygen monitoring unit 50 at the same time that the low-temperature contact C6 is open and high-temperature contact C3 is closed. This is called the oxygen-starvation situation. In the oxygen starvation situation, no fuel will be supplied to the burners 34 and the air supply will be modulated in the aforementioned reverse action mode.

In view of the preceding description, it should be appreciated that the furnace control system prevents fuel from being supplied to the monitored hearth space in either the high temperature situation or in the oxygen starvation situation when the temperature in the monitored hearth space is above a predetermined low level temperature (e.g., 1400° F.). During such no-fuel times the air supply to a monitored hearth space, both through the burners 34 and air nozzles 58, is decreased with increasing temperatures and is increased with decreasing temperatures. That is to say, the temperature monitoring unit 50 controls the air supply to hearth space 14a according to the aforementioned reverse action mode in the no-fuel situation.

This aforedescribed no-fuel mode of control in hearth space 14a continues until the temperature therein drops below the predetermined low temperature limit, whereupon the low-temperature contact C6 is closed to complete the circuit in branch 102. Completion of that circuit energizes relay R2 and it, in turn, closes contact C4 which completes the circuit in branch 100. Completion of that circuit re-energizes relay R1 and it, in turn, closes contact C8 to activate relay R4 to thereby again allow fuel to be supplied to the monitored hearth space. Re-energization of relay R1 also closes the contact C7 which, in turn, re-energizes the relay R3 which causes the solenoid actuator 72 to be energized and, following, causes the modulating damper 59 to be placed under control of the constant pressure source 74. It should be noted that there is a dead band in the aforedescribed control network when the temperature in a monitored hearth space decreases from the high to low temperature limit (e.g., from 1700° to 1400° F.). That is, the relay R1 is not energized merely by closing high temperature contact C3; in addition, contact C4 must be closed and that, in turn, requires the activation of the low temperature relay R2. This is the previously mentioned dead band feature and it prevents on/off fluttering of the control systems.

Speaking now of the furnace control system in general, it should be clearly understood that both the air nozzles and burners in the fired hearths are adjusted such that the amount of air introduced to the furnace at any temperature is less than that which is required stoichiometrically for the complete combustion of organics within the monitored hearth spaces at a preselected feed rate. In other words, the furnace is operated to pyrolyze, not to completely combust, the feed materials. The presence of burnable organics in the volatilized gases is a potential heat source which is utilized in the afterburner in a manner that will now be described.

In the afterburner 60 in FIG. 1, there is a temperature sensor 82 which is coupled via line 83 to a temperature monitoring unit 84 generally similar to the aforementioned units 50 employed in the furnace control systems. A reversing means 85 is interposed in the output line of the temperature monitoring unit 84. This reversing means is a conventional and generally widely known device capable of switching the output signals of the temperature monitoring unit 84 between a "direct" mode, wherein the output signals from the temperature monitoring unit 84 monotonically increase in magnitude with increasing temperatures and an "inverse" mode wherein the output signals from the monitoring unit monotonically decrease in magnitude with increasing temperatures. In the following, it will be assumed that if the direct mode signals are applied to a modulating damper of the type described previously, the dampers will progressively open to admit more air with increasing temperatures and will progressively close with decreasing temperatures. In other words, the afterburner dampers which receive direct mode control signals will operate the opposite of dampers in the furnace control system described previously. The same result can be achieved by providing conventional signal-switching devices other than those described previously. The important point here is that, in the so-called direct mode, the air supply to the afterburner is increased with increasing temperatures and is decreased with decreasing temperatures. In the following description it will be assumed that the afterburner control system operates in the inverse mode unless the reversing device 85 is energized, and that when the reversing device is energized the control system operates in the direct mode.

Also in the afterburner 60, there is an oxygen sensor 54 which is coupled, via line 86, to an oxygen monitoring unit 87 which may be identical to the aforementioned unit 56 employed in the furnace control system. The afterburner temperature monitoring unit 84, the afterburner oxygen monitoring unit 87, and the reversing means 85 are coupled to an afterburner control network 119 (FIG. 2) that will be described hereinafter.

A selected number of burners 34a, like the ones in the furnace, are also mounted within the afterburner 60. (For purposes of clarity, only one such burner is illustrated.) The aforementioned main fuel distributor pipe 47 is connected to the burners 34a via a branch pipe 88 wherein is interposed a shut-off valve 88a controlled by a solenoid 88b to govern the supply of fuel through the branch pipe 88. (In the following description, it will be assumed that the shut-off valve 88a is open so long as its associated solenoid 88b is energized and is closed if the solenoid is de-energized.) In the fuel inlet line to each of the burners 34a in the afterburner are connected pneumatically-controlled modulating valves 82c like the ones connected to the burners with the fired hearths in the furnace and they act in response to the quantity of air supplied to the burners to keep the fuel-air ratio constant.

To supply air to the burners in the afterburner, a branch conduit 89 is provided which leads from the aforementioned main air distributor conduit 45. In the branch conduit 89 is interposed a variable-position modulating damper 89a, like the dampers 45b associated with the fired hearths in the furnace, which automatically controls the air flow therethrough according to the amplitude of control signals carried by lines 89b from the temperature monitoring unit 84.

Also mounted in the afterburner 60 are a selected number of air nozzles 58a which are like the aforementioned nozzles 58 in the furnace. To supply air to the nozzles 58a, a branch conduit 90 extends from the main air distributor conduit 45. Interposed in the branch conduit 90 is a pneumatically actuated variable-position modulating damper 90a, also like the dampers 59a associated with the fired hearths in the furnace, which controls the air flow to the air nozzles. The modulating damper 90a is controlled by pneumatic signals from the afterburner temperature monitoring unit 84, which signals are carried to the modulating damper by line 90b and are the same as the ones applied to the damper 89a which controls the air supply to the burners 34a in the afterburner. Interposed in the control line 90b is a three-way valve 91 which can assume two alternative positions as determined by a solenoid actuator 92 connected thereto. In the first position, the modulating damper 90a is connected via the three-way valve 91 to a constant pressure source 93 which holds the modulating damper in a predetermined fixed-open position (e.g., 25% open). In the second position, there is direct communication between the temperature monitoring unit 84 and the modulating damper 90a through the three-way valve 91. In the following description, it will be assumed that the three-way valve 91 is in the first position whenever its solenoid actuator 92 is energized and is in the second position whenever its solenoid is de-energized. Energization of the solenoid actuator 92 is controlled by an afterburner control network which will now be described.

In the embodiment illustrated in FIG. 2, the control network 119 for the afterburner includes five branches 120, 122, 124, 126 and 128 connected in parallel across the aforementioned main conductors 110 and 112.

Branch 120 includes the series combination of a normally open contact C9, two normally closed contacts C10 and C11, and a relay R5. A normally open contact C12 is connected in parallel across the series combination of contacts C9 and C10. The relay R5 will be energized only when the three contacts C9, C10 and C11 are all closed, or when contacts C12 and C11 are both closed. The relay R5 is connected to actuate the contact C9 preceding it in the branch 120; that contact will be closed whenever the relay R5 is energized. As indicated by the dashed line 211, the contact C11 is controlled by the aforementioned temperature monitoring unit 84 and opens only when temperatures in excess of some predetermined high temperature (e.g., 1450° F.) are sensed within the afterburner 60. Also in branch 120, the position of the normally closed contact C10 is controlled by the oxygen monitoring unit 87 as indicated by the dashed line 212. The oxygen monitoring unit commands the contact to open whenever the oxygen level within the afterburner falls below a certain preselected valve.

Branch 122 includes a normally closed contact C14 in series with a relay R6. As indicated by the dashed line 213, the contact C14 is also controlled by temperature monitoring unit 84 and opens only when the monitoring unit senses temperatures in excess of some predetermined low temperature (e.g., 1200° F.) within the afterburner. FIG. 2 shows the contact C14 in the position that it has when afterburner temperatures exceed the low temperature limit. It should be noted that relay R6 is coupled to control the position of the normally open contact C12 in branch 120 and that contact C12 will be closed whenever relay R6 is energized.

Branch 124 includes the series combination of a normally closed contact C15, a normally open temperature-controlled contact C16, and a relay R7. A normally closed contact C17 is connected in parallel with the contact C16. The normally closed contact C15 is controlled by the relay R5 in the branch 120 and will be opened whenever that relay is energized. As indicated by the dashed line 214, the contact C16 is controlled by the temperature monitoring unit 84 and closes only when the monitoring unit senses temperatures in excess of some predetermined intermediate temperature (e.g., 1350° F.) within the afterburner. (Note that FIG. 2 shows the contact C16 in the position that it has when afterburner temperatures are above the intermediate limit.) As indicated by the dashed line 212, the contact C17 is controlled by the oxygen monitoring unit 87, which unit commands the contact C17 to open simultaneously with the contact C10 in the branch 120 whenever the oxygen level within the afterburner falls below a certain preselected value. As indicated by the dashed line 215, the relay R7 is coupled to energize the aforementioned reversing means 85, which means is energized whenever relay R7 is energized. (Because of this function, the relay R7 is hereinafter called the reversing relay.) In other words, the temperature monitoring unit 84 is placed in the direct mode of operation if, and only if, the reversing relay R7 is energized. The important result of the temperature monitoring unit 84 operating in the direct mode is that the air supply to the afterburner is increased with increasing temperatures and is decreased with decreasing temperatures.

Branch 126 includes a normally open contact C18 in series with a relay R8. The contact C18 is controlled by the aforementioned relay R5 in branch 120 and will be closed whenever that relay is energized. As indicated by dashed line 216, the relay R8 is connected to control the energization of the solenoid actuator 92 coupled to the three-way valve 91. In the illustrated embodiment, it should be understood that energization of the relay R8 energizes the solenoid actuator 92 and that, in turn, places the modulating damper 90a in communication with the constant pressure source 93, the result being that the modulating damper 90a is held in the aforementioned fixed-open position by the constant pressure source. On the other hand, the solenoid actuator 92 is de-energized when the relay R8 is de-energized and, in that case, the modulating damper 90a is under the command of the temperature monitoring unit 84.

The branch 128 includes the series combination of a normally open contact C19, a burner safety control 129, and a relay R9. The contact C19 is controlled by the relay R5 in branch 120 and will be closed only when that relay is energized. As indicated by the dashed line 217, the relay R9 is connected to control the energization of the solenoid 88b which is coupled to the afterburner fuel shut-off valve 88a. In the illustrated embodiment, it should be understood that energization of the relay R9 energizes the solenoid 88b and that, in turn, opens the fuel shut-off valve 88a. On the other hand, when the relay R9 is de-energized, the solenoid 88b is also de-energized and the shut-off valve 88a blocks the fuel supply line 88 to the afterburner.

The operation of the control network 119 for the afterburner will now be described. Although the afterburner control system is rather similar to the control systems associated with the fired hearth spaces in the furnace 10, there are several important differences. One difference is that the afterburner control system includes the reversing means 85 and its control branch 124 in the network 119.

It should also be clearly understood that, according to this invention, the burners and air nozzles in the afterburner are adjusted to maintain an abundance of air in excess of that which is required for stoichiometric combustion. In the fired hearths in the furnace, on the other hand, the burners and air nozzles are adjusted such that the amount of air introduced to the furnace is less than that which is required for stoichiometric combustion.

Assuming the temperature in the afterburner is below the low temperature limit (i.e., 1200° F. in the illustrated embodiment), the temperature-controlled contacts C11 and C14 will be closed and C16 will be open by the action of the temperature monitoring unit 84. With contact C14 closed, current will flow through branch 122 and will energize relay R6. Energization of the relay R6 will cause contact C12 to close and, because of that, relay R5 will be energized by the flow of current through branch 120 (i.e., through contacts C12 and C11 in series). Energization of the relay R5 will cause contacts C9, C18 and C19 to close and will cause the contact C15 to open. Closure of the contact C18 energizes the relay R8 and that, in turn, energizes the solenoid actuator 92 to position the three-way valve 91 such that the constant pressure source 93 holds the modulating damper 90a in the partially fixed-open position. Closure of the contact C19 by the relay R5 will, so long as the burner safety system does not detect an unsafe afterburner condition, energize the relay R9. Energization of that relay will cause the solenoid 88b to become energized and it, in turn, opens the shut-off valve 88a so that fuel is supplied to the burners 34a in the afterburner. During this time, air is supplied to the burners 34a via the branch conduit 89 and the flow therethrough is automatically controlled by the modulating valve 89a under command of the temperature monitoring unit 84. Because the contact C15 is open when the relay R5 is energized, no current flows through branch 124 under low temperature conditions and, hence, the reversing relay R7 remains de-energized. As a consequence, the reversing means 85 also remains de-energized and the temperature monitoring unit 84 operates to decrease the air supply to the afterburner with increasing temperatures and to increase the air supply with decreasing temperatures (i.e., the system functions in the aforedescribed inverse mode).

If the temperatures in the afterburner subsequently rise above the low temperature limit (e.g., 1200° F.) but do not exceed the intermediate temperature limit (e.g., 1350° F.) and if the oxygen level remains above the limiting value, the temperature-controlled contact C14 will open and the relay R6 will be de-energized. However, that will have no effect upon the fuel and air supply to the afterburner. In other words, de-energization of the relay R6 will not open circuit branch 120 under the stated conditions because the contacts C9, C10 and C11 will be closed and will provide an alternate current path through the branch.

If the afterburner temperatures then subsequently rise above the intermediate limit (e.g., 1350° F.) but do not exceed the high temperature limit (e.g., 1450° F.), the temperature-controlled contact C16 will close. That still will have no effect on the reversing relay R7, however, because it will remain de-energized due to the open condition of contact C15.

If the afterburner temperatures then subsequently rise above the high temperature limit (e.g., 1450° F.) while the oxygen level remains above the limiting value, the temperature-controlled contact C11 will open and that will de-energize the relay R5. De-energization of the relay R5 causes contacts C18 and C19 to open and they, in turn, de-energize relays R8 and R9, respectively. As a result of relay R9 being de-energized, the solenoid 88b will be de-energized and that will cause the shut-off valve 88a to block the fuel supply line 88. That is, there will be a "no-fuel" condition. As a result of the relay R8 being de-energized, the solenoid actuator 92 will be de-energized and will cause the three-way valve 91 to shift so that the modulating damper 90a is under the command of the temperature monitoring unit 84 and, accordingly, the air supply to the nozzles 58a will be modulated in parallel with the air supply to the burners 34a in the afterburner.

Another effect of the de-energization of the relay R5 in the high temperature situation is to close the contact C15 in branch 124. With contact C15 closed, current will flow through branch 124 via contacts C15 and C17 and will energize the relay R7. In turn, relay R7 energizes the reversing means 85 so that the temperature monitoring unit 84 operates in the aforementioned direct mode. In that mode of operation, the air supply to the afterburner is increased with increasing temperatures and is decreased with decreasing temperatures. This is called the "air quenching" mode of operation and, as mentioned previously, it will be accompanied by a no-fuel condition.

It should be clearly understood that, when the air quenching mode is practiced in the afterburner, temperatures will normally decrease with increasing air supply. That is, there is a quenching effect. The quenching mode cannot normally be practiced in the furnace because of the presence of a large supply of combustibles; in other words, dangerously high temperatures would usually be reached in the furnace before a quenching effect took place; this is one of the reasons furnaces are conventionally operated so that the air supply is restricted with increasing temperatures. In the afterburner, on the other hand, the supply of combustibles is limited and the quenching mode can be safely practiced. The effect of the oxygen level measurement on the operation of the afterburner control system will now be discussed.

If the oxygen level falls below the predetermined low limit when the afterburner temperatures are above the high temperature limit, oxygen monitoring unit 87 will open the contacts C10 and C17, but neither contact will affect the operation of the system at this time. That is, the relay R5 will have been previously de-energized by the opening of the temperature controlled contact C11. Also, the reversing relay R7 will remain energized by the flow of current through branch 124 via the closed contacts C15 and C16.

If the temperature in the afterburner subsequently falls to a value between the high and intermediate temperature limits while there is a deficiency of oxygen, that too will have no effect upon the operation of the system. That is, the contact C11 will close but the relay R5 will remain de-energized due to the open condition of the contacts C10 and C12.

However, if the temperature in the afterburner subsequently falls to a value between the intermediate and low temperature limits while there is a deficiency of oxygen, the system will react and the air quenching mode will cease. In that case, the contacts C16 and C17 will both be open and, hence, there will be no current flow through the branch 124. As a result, the reversing relay R7 will be de-energized and the system will operate to the inverse mode and without fuel.

If there is not an oxygen deficiency situation when the temperature in the afterburner falls to a value between the intermediate and low temperature limits, the quenching mode will continue. That is so because the reversing relay R7 will remain energized by the flow of current through branch 124 via the contacts C15 and C17.

If the temperature in the afterburner subsequently falls below the low temperature limit, the quenching mode will cease regardless of the oxygen level in the afterburner. That is so because the relay R5 is always energized at low temperatures and it controls the contact C15 to open circuit the branch 124. Without current flow through branch 124, the reversing relay R7 and the reversing means 85 are de-energized and the system operates in the inverse mode. It should be apparent that the inverse mode is desirable under these conditions because fuel is being added to the afterburner and there is no quenching effect to inhibit the temperatures from rising to a desired level.

In view of the preceding description, it can be seen that the quenching mode of operation will not be initiated until temperatures in the afterburner rise above the high temperature limit but, once initiated, the quenching mode will not cease until temperatures fall below the intermediate temperature limit. In other words, there is a dead band feature in the afterburner control system which prevents fluttering of the system due to small temperature changes about the high temperature limit.

As mentioned previously, the afterburner need not be separate from the furnace. In fact, the upper hearth space 18a of the furnace may be operated as an afterburner. In that case, the upper hearth space would be provided with burners, air nozzles, and so forth as in the aforedescribed afterburner. If that is done, the probe for oxygen monitoring unit 56 for the fired hearths would be located within the furnace proper to monitor the oxygen level of the gases prior to their entry into the upper hearth space 18a.

In the following claims, the term "sewage sludge containing organic wastes" is intended to encompass analogous sludges which, for example, are derived from industrial processes and which contain organic materials. The term "partially dewatered" refers to sludges which are typically from about fifteen to about fifty percent solids by weight and, usually, less than forty percent solids by weight.

Finally, it should be understood that the aforedescribed invention in its broad context is applicable to incinerating devices other than multiple hearth furnaces. For example, conventional fluidized bed furnaces or conventional rotary pyrolyzers can be equipped with afterburners and then operated as described hereinbefore. That is to say, such incinerating devices can be operated with a deficiency of air over their operating ranges while their afterburners are operated with excess air supplied in quantities to control afterburner temperatures by quenching.

We claim:

[1. A method of incinerating partially dewatered sewage sludge containing organic wastes in a multiple hearth furnace equipped with an afterburner connected to receive gases and vapors from the furnace, said method comprising the following steps:

a. introducing the wastes into the multiple hearth furnace and moving the same downwardly therethrough by rabbling;
b. pyrolyzing the wastes in the furnace in an oxygen deficient atmosphere and regulating that atmosphere to only partially complete the oxidation of substances which are pyrolyzed from the wastes;
c. conveying the partially oxidized products of pyrolysis in the medium of gases and vapors from the furnace to the afterburner; and
d. introducing sufficient air into the afterburner to complete the oxidation of the partially oxidized substances carried by the gases and vapors from the furnace.]

2. A method of incinerating partially dewatered sewage sludge containing organic wastes in a multiple hearth furnace equipped with an afterburner connected to receive gases and vapors from the furnace, said method comprising the following steps:

a. introducing the wastes into the multiple hearth furnace and moving the same downwardly therethrough by rabbling;
b. pyrolyzing the wastes in the furnace in an oxygen deficient atmosphere and regulating that atmosphere to only partially oxidize the substances which are pyrolyzed from the organic wastes;
c. conveying the partially oxidized products of pyrolysis in the medium of gases and vapors from the furnace to the afterburner; [and]
d. at temperatures within said afterburner above a predetermined first temperature introducing air into the afterburner in quantities in excess of that required to complete the oxidation of the partially oxidized substances carried by the gases and vapors from the furnace and regulating the quantity of air introduced to increase with increasing temperatures and to decrease with decreasing temperatures so as to maintain temperatures in the afterburner within a predetermined range[.];
*e. introducing fuel into said afterburner for burning when the temperature in said afterburner falls below a predetermined second temperature which is below said predetermined first temperature; and*
*f. monitoring the oxygen content of the gases and vapors within the afterburner and stopping the introduction of fuel into the afterburner when the monitored oxygen content is less than a predetermined value and the temperature in said afterburner is above said second predetermined value.*

3. The method of claim 2 wherein, at temperatures within said afterburner below [a] *said* predetermined second temperature [which is below said predetermined first temperature,] the quantity of air introduced into the afterburner is regulated to decrease with increasing temperatures and to increase with decreasing temperatures within the afterburner.

[4. A method of incinerating partially dewatered sewage sludge containing organic wastes in a multiple hearth furnace equipped with an afterburner connected to receive gases and vapors from the furnace, said method comprising the following steps:

a. introducing the partially dewatered wastes into the multiple hearth furnace and moving the same downwardly therethrough by rabbling;
b. introducing air and fuel into the furnace to pyrolyze the wastes and regulating the introduction of the air and fuel so that the atmosphere within the furnace is deficient in oxygen and so that the organic substances which are pyrolyzed from the wastes are only partially oxidized; and
c. introducing air into the afterburner in quantities in excess of that required to complete the oxidation of the partially oxidized substances carried by the gases and vapors from the furnace and regulating the quantity of air introduced into the afterburner to maintain temperatures therein within a predetermined range.]

[5. The method of claim 4 wherein, at temperatures within said afterburner above a predetermined first temperature, the quantity of air introduced into the afterburner is regulated to increase with increasing temperatures and to decrease with decreasing temperatures.]

[6. The method of claim 5 wherein, at temperatures within said afterburner below a predetermined second temperature which is below said predetermined first temperature, the quantity of air introduced into the afterburner is regulated to decrease with increasing temperatures and to increase with decreasing temperatures within the afterburner.]

[7. The method of claim 6 wherein the quantity of air introduced into the furnace is regulated to decrease with increasing temperatures in the furnace and to increase with decreasing temperatures.]

[8. The method of claim 7 wherein, at temperatures above a predetermined temperature within the furnace, the introduction of fuel into the furnace is stopped.]

[9. The method of claim 6 wherein said first predetermined temperature is about 1450° F. and said second predetermined temperature is about 1200° F.]

[10. The method of claim 6 wherein, at temperatures within said afterburner below said predetermined second temperature, fuel is introduced into said afterburner for burning.]

[11. The method of claim 10 wherein, at temperatures within said afterburner above said predetermined first temperature, the introduction of fuel is stopped.]

[12. The method of claim 11 further including the step of monitoring the oxygen content of the gases and vapors within the afterburner and stopping the introduction of fuel into the afterburner when the monitoring oxygen content is less than a predetermined value and the temperature in the afterburner is above said second predetermined value.]

[13. A system for incinerating partially dewatered sewage sludge containing organic wastes comprising:

a. a multiple hearth furnace inclusive of means for admitting the wastes into said furnace and means for moving the wastes downwardly through said furnace by rabbling;
b. first burner means connected in communication with said furnace for introducing air and fuel thereinto for pyrolyzing the wastes;
c. means connected to said first burner means to control the action thereof so that atmosphere within said furnace is deficient in oxygen and the organic substances which are pyrolyzed from the organic wastes are only partially oxidized;
d. an afterburner connected to said furnace to receive the partially oxidized products of pyrolysis in the medium of gases and vapors from said furnace;
e. second burner means connected in communication with said afterburner for introducing air and fuel thereinto for combustion; and
f. afterburner control means connected to said second burner means to control the introduction of air and fuel into said afterburner to complete the oxidation of the partially oxidized substances carried by the gases and vapors from the furnace.]

14. [The system of claim 13 further including] *A system for incinerating partially dewatered sewage sludge containing organic wastes comprising:*

*a. a multiple hearth furnace inclusive of means for admitting the wastes into said furnace and means for moving the wastes downwardly through said furnace by rabbling;*
*b. first burner means connected in communication with said furnace for introducing air and fuel thereinto for pyrolyzing the wastes;*
*c. means connected to said first burner means to control the action thereof so that atmosphere within said furnace is deficient in oxygen and the organic substances which are pyrolyzed from the organic wastes are only partially oxidized;*
*d. an afterburner connected to said furnace to receive the partially oxidized products of pyrolysis in the medium of gases and vapors from said furnace;*
*e. second burner means connected in communication with said afterburner for introducing air and fuel thereinto for combustion;*
*f. afterburner control means connected to said second burner means to control the introduction of air and fuel into said afterburner to complete the oxidation of the partially oxidized substances carried by the gases and vapors from the furnace;*
*g.* afterburner temperature monitoring means mounted in communication with said afterburner to monitor the temperature of the gases and vapors therein, said afterburner control means being connected to said afterburner temperature monitoring means and responsive to signals therefrom so that, when temperatures within said afterburner exceed a predetermined first temperature, the quantity of air introduced into said afterburner through said second burner means is increased with increasing monitored temperatures and is decreased with decreasing monitored temperatures[.];
*h. afterburner oxygen monitoring means connected in communication with said afterburner to monitor the oxygen content of the gases and vapors therein; and*
*i. reversing means connected to said afterburner control means and said afterburner oxygen monitoring means to reverse the action of said afterburner control means at monitored temperatures below a predetermined*

*second temperature which is less than said predetermined first temperature and monitored oxygen content less than a predetermined value, such that the quantity of air introduced into said afterburner through said second burner means is decreased with increasing temperatures and is increased with decreasing temperatures when the action of said afterburner control means is reversed.*

[15. The system of claim 14 further including reversing means connected to said afterburner control means to reverse the action thereof at monitored temperatures below a predetermined second temperature which is less than said predetermined first temperature, such that the quantity of air introduced into said afterburner through said second burner means is decreased with increasing temperatures and is increased with decreasing temperatures when the action of said afterburner control means is reversed.]

[16. The system of claim 13 further including afterburner temperature monitoring means mounted in communication with said afterburner to monitor the temperature of the gases and vapors therein, said afterburner control means being connected to said afterburner temperature monitoring means and responsive to signals therefrom so that, when temperatures within said afterburner exceed a predetermined first temperature, the introduction of fuel into said afterburner is stopped and the quantity of air introduced into said afterburner through said second burner means is increased with increasing monitored temperatures and is decreased with decreasing monitored temperatures.]

[17. The system of claim 16 further including reversing means connected to said afterburner control means to reverse the action thereof at monitored temperatures below a predetermined second temperature which is less than said predetermined first temperature, such that the quantity of air and fuel introduced into said afterburner through said second burner means is decreased with increasing temperatures and is increased with decreasing temperatures when the action of said afterburner control means is reversed.]

18. [The system of claim 17 further including] *A system for incinerating partially dewatered sewage sludge containing organic wastes comprising:*

*a. a multiple hearth furnace inclusive of means for admitting the wastes into said furnace and means for moving the wastes downwardly through said furnace by rabbling;*

*b. first burner means connected in communication with said furnace for introducing air and fuel thereinto for pyrolyzing the wastes;*

*c. means connected to said first burner means to control the action thereof so that atmosphere within said furnace is deficient in oxygen and the organic substances which are pyrolyzed from the organic wastes are only partially oxidized;*

*d. an afterburner connected to said furnace to receive the partially oxidized products of pyrolysis in the medium of gases and vapors from said furnace;*

*e. second burner means connected in communication with said afterburner for introducing air and fuel thereinto for combustion;*

*f. afterburner control means connected to said second burner means to control the introduction of air and fuel into said afterburner to complete the oxidation of the partially oxidized substances carried by the gases and vapors from the furnace;*

*g. afterburner temperature monitoring means mounted in communication with said afterburner to monitor the temperature of the gases and vapors therein, said afterburner control means being connected to said afterburner temperature monitoring means and responsive to signals therefrom so that, when temperatures within said afterburner exceed a predetermined first temperature, the introduction of fuel into said afterburner is stopped and the quantity of air introduced into said afterburner through said second burner means is increased with increasing monitored temperatures and is decreased with decreasing monitored temperatures;*

*h. reversing means connected to said afterburner control means to reverse the action thereof at monitored temperatures below a predetermined second temperature which is less than said predetermined first temperature, such that the quantity of air and fuel introduced into said afterburner through said second burner means is decreased with increasing temperatures and is increased with decreasing temperatures when the action of said afterburner control means is reversed;*

*i.* afterburner oxygen monitoring means connected in communication with said afterburner to monitor the oxygen content of the gases and vapors [herein] *therein; and*

*j.* said afterburner control means and said reversing means being connected to said afterburner oxygen monitoring means and responsive to signals therefrom so that the action of said afterburner control means is reversed when the monitored oxygen level falls below said predetermined value after the temperature monitored within said afterburner has fallen below a third predetermined temperature which is between said first and second predetermined temperatures.

[19. The system of claim 13 wherein said afterburner comprises the uppermost space of said multiple hearth furnace.]

20. A system for incinerating partially dewatered sewage sludge containing organic wastes comprising:

a. a multiple hearth furnace including (i) means for admitting the organic wastes into said multiple hearth furnace; (ii) means for moving the wastes downwardly through said furnace by rabbling; (iii) first burner means connected to introduce air and fuel into selected hearth spaces in said furnace to pyrolyze the organic wastes therein; (iv) temperature monitoring means mounted in each of said selected hearth spaces to monitor the temperatures therein; (v) oxygen monitoring means mounted in communication with said furnace to monitor the oxygen content of the gases and vapors leaving said furnace; (vi) first burner control means connected to each of said first burner means and responsive to signals from an associated one of said temperature monitoring means to increase the quantity of air supplied through said first burner means as temperatures in the associated hearth space decrease and to decrease the supply of air as temperatures therein increase, said first burner control means further being connected to said oxygen monitoring means and responsive to signals therefrom to stop the introduction of fuel through said first burner means when the oxygen content of the gases and vapors leaving said furnace is less than a predetermined value at the same time that the temperature within the associated hearth spaces exceeds a predetermined second value;

b. an afterburner connected to said furnace to receive the partially oxidized products of pyrolysis in the medium of gases and vapors from said furnace and including: (i) second burner means connected to introduce air and fuel into the afterburner for combustion to complete the oxidation of the partially oxidized substances carried by the gases and vapors from said multiple hearth furnace; (ii) afterburner temperature monitoring means mounted in said afterburner to monitor the temperature therein; (iii) afterburner oxygen monitoring means mounted in communication with said afterburner to monitor the oxygen content of the gases and vapors therein; (iv) second burner control means connected to said second burner means and responsive to signals from said afterburner temperature monitoring means so that the quantity of air supplied through said second burner means is increased as temperatures in said afterburner increase and is decreased as the temperatures decrease when temperatures within said afterburner exceed a predetermined first monitored temperature, and so that the quantity of air supplied through said second burner means is decreased with increasing temperatures and is increased with decreasing temperatures at temperatures below a predetermined second monitored temperature which is below said predetermined first monitored temperature, said second burner control means further being connected to said afterburner oxygen monitoring means and responsive to signals therefrom to stop the introduction of fuel through said second burner means when the monitored oxygen content is less than a predetermined monitored value at the same time that the temperature within the afterburner exceeds said predetermined second monitored temperature.

21. The system of claim 20 further including reversing means connected to said afterburner control means to reverse the action thereof at monitored temperatures below said predetermined monitored second temperature so that the quantity of air introduced into said afterburner through said second burner means is decreased with increasing temperatures and is increased with decreasing temperatures when the action of said afterburner control means is reversed.

[22. A method of incinerating partially dewatered sewage sludge containing organic wastes in an incinerating device equipped with an afterburner connected to receive gases and vapors from the incinerating device, said method of comprising the following steps:

a. introducing the wastes into the incinerating device;

b. pyrolyzing the wastes in the incinerating device in an oxygen deficient atmosphere and regulating that atmosphere to only partially complete the oxidation of substances which are pyrolyzed from the wastes;

c. conveying the partially oxidized products of pyrolysis in the medium of gases and vapors from the incinerating device to the afterburner; and d. introducing sufficient air into the afterburner to complete the oxidation of the partially oxidized substances carried by the gases and vapors from the incinerating device.]

[23. A method of incinerating partially dewatered sewage sludge containing organic wastes in a multiple hearth furnace equipped with an afterburner connected to receive gases and vapors from the furnace, said method comprising the following steps:

a. introducing the wastes into the multiple hearth furnace and moving the same downwardly therethrough by rabbling;

b. pyrolyzing the wastes in the furnace in an oxygen deficient atmosphere and regulating that atmosphere to only partially oxidize the substances which are pyrolyzed from the organic wastes;

c. conveying the partially oxidized products of pyrolysis in the medium of gases and vapors from the furnace to the afterburner; and d. introducing air into the afterburner in quantities in excess of that required to complete the oxidation of the partially oxidized substances carried by the gases and vapors from the furnace and regulating the quantity of air introduced to maintain temperatures in the afterburner within a predetermined range.]

*24. A method of incinerating partially dewatered sewage sludge containing organic wastes in a multiple hearth furnace equipped with an afterburner connected to receive gases and vapors from the furnace, said method comprising the following steps:*

*a. introducing the wastes into the multiple hearth furnace and moving the same downwardly therethrough by rabbling;*

*b. pyrolyzing the wastes in the furnace in an oxygen deficient atmosphere and regulating that atmosphere to only partially oxidize the substances which are pyrolyzed from the organic wastes;*

*c. conveying the partially oxidized products of pyrolysis in the medium of gases and vapors from the furnace to the afterburner;*

*introducing air into the afterburner in quantities in excess of that required to complete the oxidation of the partially oxidized substances carried by the gases and vapors from the furnace and regulating the quantity of air introduced to maintain temperatures in the afterburner within a predetermined range;*

*e. monitoring the oxygen content and temperature of gases and vapors within the afterburner; and*

*f. when the oxygen content and temperature are below predetermined values, regulating the quantity of air introduced into the afterburner to decrease with increasing temperature and to increase the decreasing temperature.*

*25. A method of incinerating partially dewatered sewage sludge containing organic wastes in a multiple hearth furnace equipped with an afterburner connected to receive gases and vapors from the furnace, said method comprising the following steps:*

*a. introducing the partially dewatered wastes into the multiple hearth furnace and moving the same downwardly therethrough by rabbling;*

*b. introducing air and fuel into the furnace to pyrolyze the wastes and regulating the introduction of the air and fuel so that the atmosphere within the furnace is deficient in oxygen and so that the organic substances which are pyrolyzed from the wastes are only partially oxidized;*

*c. introducing air into the afterburner in quantities in excess of that required to complete the oxidation of the partially oxidized substances carried by the gases and vapors from the furnace and regulating the quantity of air introduced into the afterburner to maintain temperatures therein within a predetermined range;*

*d. introducing fuel into said afterburner when the temperature within said afterburner falls below a first predetermined value; and*

*e. monitoring the oxygen content of the gases and vapors within the afterburner and stopping the introduction of fuel into the afterburner when the monitoring oxygen content is less than a predetermined value and the temperature in the afterburner is above said first predetermined value.*

*26. The method of claim 25 wherein, at temperatures within said afterburner above a predetermined second value, the quantity of air introduced into the afterburner is regulated to increase with increasing temperatures and to decrease with decreasing temperatures.*

*27. The method of claim 26 wherein, at temperatures within said afterburner below said predetermined first value which is below said predetermined second value, the quantity of air introduced into the afterburner is regulated to decrease with increasing temperatures and to increase with decreasing temperatures within the afterburner.*

*28. The method of claim 27 wherein the quantity of air introduced into the furnace is regulated to decrease with increasing temperatures in the furnace and to increase with decreasing temperatures.*

*29. The method of claim 27 wherein said first predetermined value of temperature is about 1200° F. and said second predetermined value of temperature is about 1450° F.*

*30. The method of claim 27 wherein, at temperatures within said afterburner above said predetermined second value, the introduction of fuel is stopped.*

* * * * *